(12) United States Patent
Branchaud-Charron et al.

(10) Patent No.: US 11,537,886 B2
(45) Date of Patent: Dec. 27, 2022

(54) METHOD AND SERVER FOR OPTIMIZING HYPERPARAMETER TUPLES FOR TRAINING PRODUCTION-GRADE ARTIFICIAL INTELLIGENCE (AI)

(71) Applicant: Element AI Inc., Montreal (CA)

(72) Inventors: Frédéric Branchaud-Charron, Montreal (CA); Parmida Atighehchian, Montreal (CA); Jan Freyberg, Montreal (CA); Lorne Schell, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 516 days.

(21) Appl. No.: 16/779,470

(22) Filed: Jan. 31, 2020

(65) Prior Publication Data

US 2021/0241165 A1    Aug. 5, 2021

(51) Int. Cl.
*G06N 3/08* (2006.01)
*G06N 3/12* (2006.01)

(52) U.S. Cl.
CPC ............... *G06N 3/08* (2013.01); *G06N 3/086* (2013.01); *G06N 3/12* (2013.01); *G06N 3/126* (2013.01)

(58) Field of Classification Search
CPC ........ G06N 3/08; G06N 3/0445; G06N 3/082; G06N 3/084; G06N 3/10; G06N 5/00;
(Continued)

(56) References Cited

U.S. PATENT DOCUMENTS 9,582,490 B2    2/2017   Simard et al.
10,102,481 B2   10/2018  Kim et al.
(Continued)

OTHER PUBLICATIONS

Chaturvedi, Saket, "How to implement Pre-trained models with only modifications in the output layer?", https://www.researchgate.net/post/How_to_implement_Pretrained_models_with_only_modifications_in_the_output_ayer, Feb. 2, 2018.
(Continued)

*Primary Examiner* — Pegeman Karimi
(74) *Attorney, Agent, or Firm* — Gowling WLG (Canada) LLP (57) ABSTRACT

A method and server for optimizing hyperparameter tuples for training production-grade artificial intelligence (AI) models. For each one of the AI models, AI model features are extracted and, for the one AI model, an initial distribution of n hyperparameter tuplesis created considering the extracted AI model features therefor. A loop is repeated, until metric parameters are satisfied, comprising: evaluating latency from training the one AI model for each of the n hyperparameters tuples; evaluating model uncertainty from training the one AI model for each of the n hyperparameters tuples; for each of the n hyperparameters tuples, computing a blended quality measurement from the evaluated latency and evaluated model uncertainty; replacing m hyperparameter tuples having the worst blended quality measurements with m newly generated hyperparameter tuples. The metric parameters include one or more of a threshold value on model uncertainty and blended quality measurement gain between successive loops.

14 Claims, 5 Drawing Sheets

(58) Field of Classification Search
CPC .......... G06N 20/00; G06N 3/086; G06N 3/12; G06N 3/126
See application file for complete search history.

(56) References Cited

U.S. PATENT DOCUMENTS

| | | |
|---|---|---|
| 10,108,902 B1 | 10/2018 | Lockett |
| 2005/0027664 A1 | 2/2005 | Johnson et al. |
| 2016/0004580 A1* | 1/2016 | Momot ............... G06F 11/0721 714/47.3 |
| 2017/0124487 A1 | 5/2017 | Szeto et al. |
| 2018/0240031 A1 | 8/2018 | Huszar et al. |
| 2018/0285771 A1 | 10/2018 | Lee et al. |
| 2018/0300576 A1 | 10/2018 | Dalyac et al. |
| 2019/0180196 A1* | 6/2019 | Terry ................... G06K 9/6227 |
| 2019/0236478 A1 | 8/2019 | Wu et al. |
| 2019/0238436 A1* | 8/2019 | Volos ................. H04L 43/0852 |
| 2019/0280954 A1* | 9/2019 | Volos ..................... G06N 7/005 |
| 2019/0286973 A1* | 9/2019 | Kovvuri ................. G06N 3/04 |

OTHER PUBLICATIONS

Gal et al., "Dropout as a Bayesian Approximation: Representing Model Uncertainty in Deep Learning", https://arxiv.org./abs/1506.02142, Oct. 4, 2016.
Sal et al., "Deep Bayesian Active Learning with Image Data", https://arxiv.org/abs/1703.02910, Mar. 8, 2017.
Kandasamy et al., "Bayesian Active Learning for Posterior Estimation", Proceedings of the Twenty-Fourth International Joint Conference on Artificial Intelligence, IJCAI, Jul. 25, 2015.

\* cited by examiner

METHOD AND SERVER FOR OPTIMIZING HYPERPARAMETER TUPLES FOR TRAINING PRODUCTION-GRADE ARTIFICIAL INTELLIGENCE (AI)

TECHNICAL FIELD

The present invention relates to machine learning and, more particularly, to improving the performance of machine learning efforts.

BACKGROUND

Massive labelled datasets are used to train machine learning and/or deep learning algorithms in order to produce artificial intelligence models. The desired models tend to become more complex and/or trained in a more complex and thorough manner, which leads to an increase in the quality and quantity of the data required. Crowdsourcing is an effective way to get input from humans in order to label large datasets. The human labelers from the crowd may mark-up or annotate the data to show a target that artificial intelligence model will be expected to predict. Therefore, the data used to train artificial intelligence models needs to be structured and labeled correctly. Furthermore, improving the efficiency of each of the AI training cycles is becoming an important concern, especially when moving away from strictly research AI model training towards production-grade AI model training.

The present invention addresses such needs.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for optimizing hyperparameter tuples for training production-grade artificial intelligence (AI) models. The method includes for each one of the AI models, extracting AI model features and, for the one AI model, creating an initial distribution of n hyperparameter tuples considering the extracted AI model features therefor. The method also includes repeating a loop, until metric parameters are satisfied, comprising: evaluating latency from training the one AI model for each of the n hyperparameters tuples; evaluating model uncertainty from training the one AI model for each of the n hyperparameters tuples; for each of the n hyperparameters tuples, computing a blended quality measurement from the evaluated latency and evaluated model uncertainty; replacing m hyperparameter tuples having the worst blended quality measurements with m newly generated hyperparameter tuples. The metric parameters include one or more of a threshold value on model uncertainty and blended quality measurement gain between successive loops. Other embodiments of this aspect include corresponding computer systems, apparatus, and computer programs recorded on one or more computer storage devices, each configured to perform the actions of the methods.

Implementations may include one or more of the following features. The method may include repeating the loop between training cycles for the one AI model thereby optimizing the hyperparameter tuples during production use of the one AI model. The method may include repeating the loop for each of the AI models. The m hyperparameter tuples having the worst blended quality may be replaced with the m newly generated hyperparameter tuples for which a fraction of hyperparameters constituents is actively selected and a remaining fraction of the hyperparameters constituents may be randomly selected. Each one of the m hyperparameter tuples having the worst blended quality may be replaced with one of the newly generated hyperparameter tuples having an actively selected portion of hyperparameter tuples' constituents and a randomly generated portion of the hyperparameter tuples' constituents. The hyperparameter tuples' constituents of the actively selected portion may be chosen based on the blended quality measurement from other ones of the n hyperparameter tuples. Each of the hyperparameter tuples' constituents of the randomly generated portion may be generated within a pre-established range. Implementations of the described techniques may include hardware, a method or process, or computer software on a computer-accessible medium.

One general aspect includes a server for optimizing hyperparameter tuples for training production-grade artificial intelligence (AI) models. The server also includes a processing module that, for each one of the AI models, extracts AI model features and, for the one AI model, creates an initial distribution of n hyperparameter tuples considering the extracted AI model features therefor. The processing module repeats a loop, until metric parameters are satisfied, for evaluating latency from training the one AI model for each of the n hyperparameters tuples; evaluating model uncertainty from training the one AI model for each of the n hyperparameters tuples; for each of the n hyperparameters tuples, computing a blended quality measurement from the evaluated latency and evaluated model uncertainty; replacing m hyperparameter tuples having the worst blended quality measurements with m newly generated hyperparameter tuples. The metric parameters include one or more of a threshold value on model uncertainty and blended quality measurement gain between successive loops. Other embodiments of this aspect include corresponding computer systems, apparatus, and computer programs recorded on one or more computer storage devices, each configured to perform the actions of the methods.

Implementations may include one or more of the following features. The server may repeat the loop between training cycles for the one AI model thereby optimizing the hyperparameter tuples during production use of the one AI model. The server may repeat the loop for each of the AI models. The m hyperparameter tuples having the worst blended quality may be replaced with the m newly generated hyperparameter tuples for which a fraction of hyperparameters constituents is actively selected and a remaining fraction of the hyperparameters constituents may be randomly selected. Each one of the m hyperparameter tuples having the worst blended quality may be replaced with one of the newly generated hyperparameter tuples having an actively selected portion of hyperparameter tuples' constituents and a randomly generated portion of the hyperparameter tuples' constituents. The hyperparameter tuples' constituents of the actively selected portion are chosen based on the blended quality measurement from other ones of the n hyperparameter tuples. Each of the hyperparameter tuples' constituents of the randomly generated portion may be generated within a pre-established range.

Implementations of the described techniques may include hardware, a method or process, or computer software on a computer-accessible medium.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Machine learning applications are known to require big amounts of data. For machine learning models to be trained, a set of labelled data of a certain dimension is also required. The set of labelled data may present defects caused by labeling efficacy. Active learning is a way to reduce the amount of labelled data needed to train machine-learning models. However, the performances of common active learning techniques are limited when applied on high-dimensional data.

A first set of embodiments of the present invention relates to a method and a system for combining active learning and deep learning to train deep-learning models. One goal is to optimize the production of Artificial Intelligence AI models performing labelling tasks and annotation requests. The desired AI models are achieved by training a deep neural network to be able to learn from a small portion of a dataset and actively select and query the next portion of the dataset to label. In some embodiments, a trusted labeler has to label only a selected portion of the dataset while improving the performance of the AI models. In such exemplary embodiments, a strategy may be developed to reduce the size of the portion of the dataset that is labelled by the trusted labeler.

In a second set of embodiments, a method and a system for managing a dataset are disclosed. The method makes training AI models efficient by performing the relevant computations on a plurality of processing nodes. The computations are performed in parallel on chunk subsets of the dataset. The creation of a data mask for describing a labeling status of each data items of the dataset is also described. One exemplary advantage of the data mask is to provide a summarized information about the labeling status of each data item of the dataset, thereby making tracking and working with specific data items less time and energy consuming. The method disclosed also allows for parallel training of an AI model on multiple nodes.

In a third set of embodiments, a method and a system are disclosed for optimizing hyperparameters of a machine-learning algorithm in the context of production and not only in the context of research. The hyperparameters can affect the quality of the AI model given at the end of the training process. The hyperparameters may also affect time and memory cost of running the learning algorithm. Therefore, one goal of the present invention is to optimize the hyperparameters of AI models.

In accordance with the first set of embodiments, a method and a system are provided for producing AI models of higher quality while minimizing resource consumption associated to production of the desired AI models. The AI models are the result of applying learning algorithms on a training dataset. The training dataset contains data items for which a labeling task is completed by a trusted labeler (e.g., a sentence for which a translation is completed). Each labelling task may regroup one or more annotation requests. Therefore, each data item may have associated therewith one or more annotation requests. The dataset also comprises for each data item, for each annotation request one or more labels representing answers to the annotation request. The dataset also comprises a unique labeler identifier for each labeler. The trusted labeler can be a person or group of persons or a system or group of systems. The models produce predicted labels representing an answer of the AI model to each of the labeling tasks of the generalization dataset. The generalization dataset contains raw data items for which a labeling task is to be completed (e.g., a sentence for which a translation is to be completed). Each labelling task may regroup one or more annotation requests. Therefore, each data item may have associated therewith one or more annotation requests. For each raw data item, the model produces one or more predicted labels representing answers to the corresponding annotation requests and a relevancy value that takes into account the model's uncertainty about the correctness of the predicted label. In some embodiments, the generalization dataset may also comprise previously labelled data.

Examples of labelling tasks include classification tasks where the AI model is asked to specify the class to which a data item belongs. In this case, the output of the AI model may be a probability distribution over classes. The predicted label of the model may be the class having the highest probability density. Another example of labelling tasks is transcription tasks where the AI model is asked to produce a textual form of unstructured data. Optical character recognition is an example of a transcription task where the AI model is fed with an image containing some form of text and is asked to replicate the text contained in the image in form of a sequence of characters. Translation is another example of a labelling task where the AI model is given a text in a first language and is asked to translate it to one or more other languages. A person skilled in the art will already recognize that there are many labeling tasks that can be supported by the present invention. Examples of labeling tasks include: structured output, anomaly detection, synthesis and sampling, answering a question, providing a solution to a problem, grading or giving a qualitative evaluation, content moderation, search relevance where the labeler is asked to return relevant results on the first search, etc.

Figure 5A:
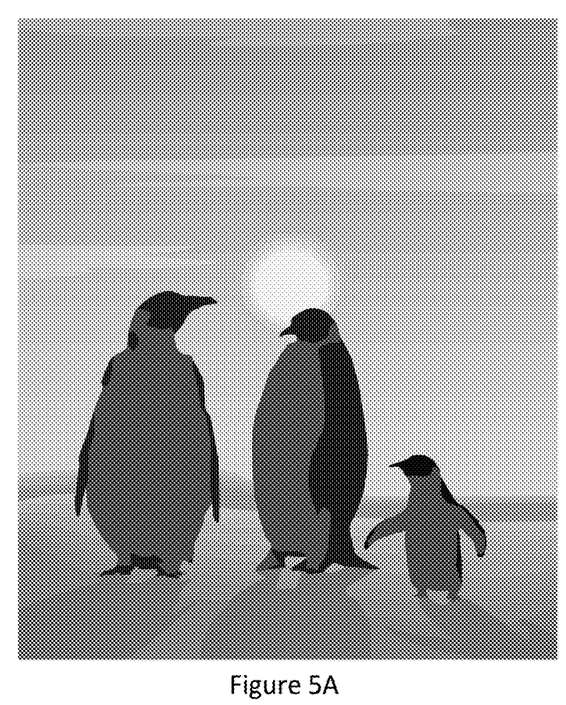
FIG. 5A shows a data item of a dataset in accordance with the teachings of the present invention.

FIG. 5A shows a hypothetical data item for which a classification task is to be performed. The classification task may, for example, include a plurality of annotation requests such as: Is there an animal in the image of the data item? Identify the name of the species in the image of the data item? Segment the image of the data item to bring-out and highlight the animal. For each annotation request, a labeler will produce a label answering the annotation request. In case of the data item of FIG. 5A, the labeler may answer the first annotation request with a "yes", the second with "lesser auk", and the third with the image of FIG. 5B. In a preferred set of embodiments, the labeler may be asked to produce answers for a first annotation request for a plurality of data items of the dataset, and then to produce answers for a second annotation request for a plurality of data items of the dataset, and so on.

Figure 5B:
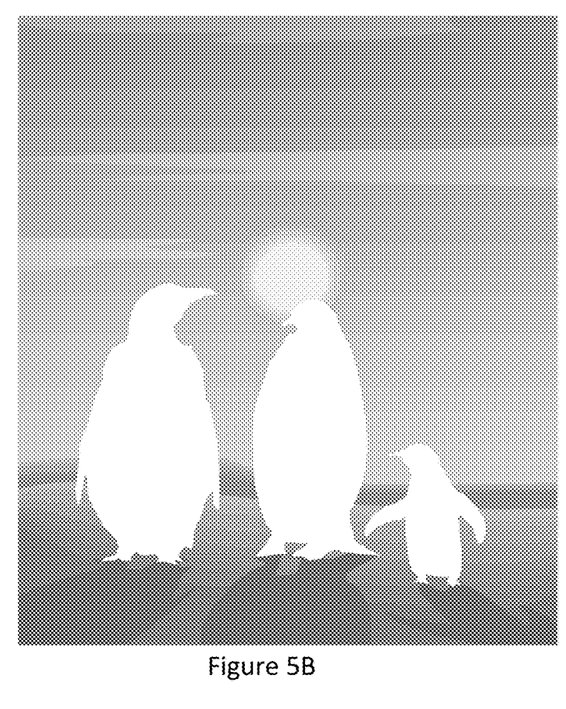
FIG. 5B shows a label representing an answer to an annotation request associated with the data item of FIG. 1A in accordance with the teachings of the present invention.

A labelling task is associated to a data item and might comprise one or more annotation requests, or sub tasks, as exemplified with reference to FIGS. 1A and 1B. For the sake of simplicity, in the present discussion, the terminology "labelling task" will be used to represent a single annotation request. Skilled persons will readily acknowledge that the labelling task may however represent more than one annotation request and that the teachings related to the present invention should be construed as such.

During the AI model training process, the AI model is provided with tasks, data items, and their corresponding trusted labels. From this information, the AI model computes the parameters that fit best the training dataset. The parameters include weights that may be seen as the strength of the connection between two variables (e.g. two neurons of two subsequent layers). The parameters may also include a bias parameter that measures the expected deviation from the true label. The learning process refers to finding the optimal parameters that fit the training dataset. This is done typically by minimizing the training error defined as the distance between the predicted label computed by the AI model and the trusted label. The goal of the training process is to find values of parameters that make the prediction of the AI model optimal.

A hyperparameter influences the way the learning algorithm providing the AI model works and behaves. The hyperparameters may affect time and memory costs of running the learning algorithm. The hyperparameters may also affect the quality of the AI model given at the end of the training process. The hyperparameters may also affect the ability of the AI model to infer correct results when used on new data items. Examples of hyperparameters include: number of hidden units, learning rate, dropout rate, number of epochs representing the number of cycles through the training dataset, etc. Different methods can be used to tune the hyperparameters such as random search or Bayesian hyperparameter optimization, etc. The hyperparameters may be tuned manually or may be tuned automatically, e.g., using tuning libraries.

A part of the training process is testing the AI model on new data items. During the testing phase, the AI model is provided with new data items for which a predicted label is to be computed. The ability of the AI model to infer correct labels for new data items is called generalization. The performance of the AI model is improved by diminishing the generalization error defined as the expected value of the error on a new data item.

Regularization methods such as Dropout, Monte-Carlo Dropout, Bagging, etc. may be used to diminish the generalization error of the deep-learning algorithm. This may be described as means of diminishing interdependent learning amongst the neurons. In the case of Dropout, this is typically achieved by randomly ignoring a subset of neurons during the training phase of the AI model. The ignored neurons are not considered during one or more particular forward or backward passes. These regularization methods generate a set of sub-models from the initial model. For each labeling task, each sub-model generates a sub-model-specific predicted label. The sub-model-specific predicted labels thus generated result in a label distribution for each task. Based on this distribution and using several methods such as Bayesian Network methods, a model-uncertainty measurement representing the prediction confidence of the model may be computed for each data item.

Another method for computing the model-uncertainty measurement may take into account the posterior distribution of weights computed by each sub-model. At the end of each cycle of the sub-models' training, each sub-model has generated a matrix containing the weights computed during the cycle. A metric such as standard deviation of the generated matrices may be used to measure the amount of variation and dispersion of the generated matrices. This standard deviation can be used as a measure of the model-uncertainty.

Regularization methods such as Dropout are used to avoid overfitting of the AI model that occurs when the AI model learns the statistical noise in the training data, which results in a high generalization error when the model is evaluated on new data. Dropout has the effect of making the training process noisy, forcing neurons within a layer to take on more or less responsibility for the inputs.

The relevancy value of the labeling tasks is computed based on the model uncertainty measurement. The model uncertainty measurement may be computed using clustering methods such as coresets.

In accordance with the first set of embodiments, a dynamic list of labeling tasks is created and updated during the training process of the AI model. The dynamic list comprises data items, and for each data item, a labelling task that is to be completed and a relevancy value associated to each predicted label, or to each data item on which the task is to be completed. The labeling tasks of the dynamic list are ordered by their relevancy value. The labeling tasks are to be completed by one or more trusted labelers with respect to their order of relevancy (i.e., the most relevant tasks being prioritized over lesser relevant tasks).

In certain embodiments, the AI model may be trained to complete several task categories. In this case, a relevancy value is computed for each data item of each task category and for each task category, the data items with the highest relevancy values are inserted into the dynamic list.

In a preferred embodiment of the first set of embodiments, the dynamic list is transparent to the labeler and the labeler receives the next labeling task once the previous labeling task is completed. The labeling tasks are communicated, or otherwise made available, to the labeler by order of their relevancy value (i.e., the labeling tasks of the data items having the highest relevancy value are communicated first to the labeler). In other embodiments, the labeler may receive the complete dynamic list of labeling tasks.

Figure 1:
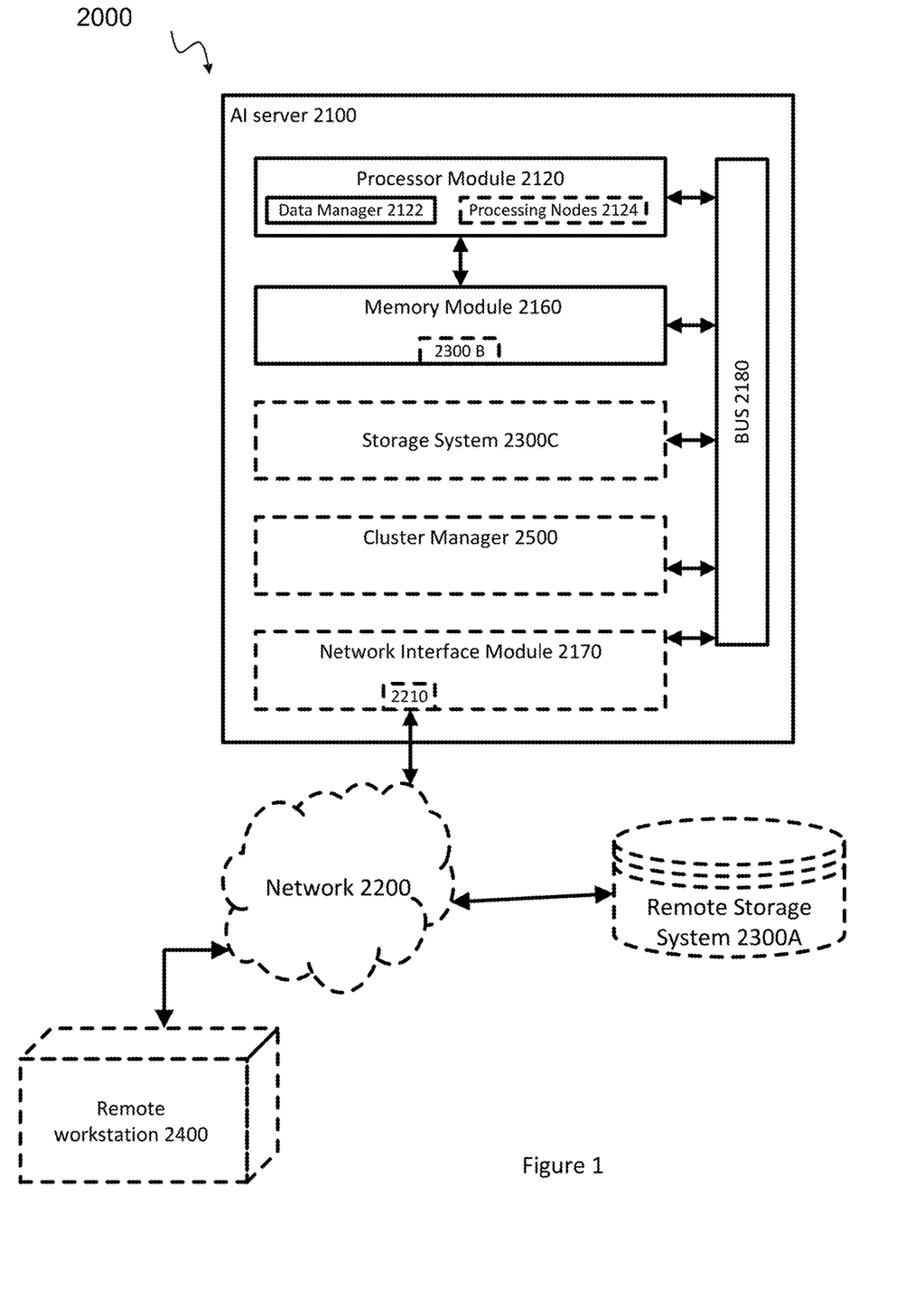
FIG. 1 is a logical modular representation of an exemplary artificial intelligence server in accordance with the teachings of the present invention.

FIG. 1 shows a logical modular representation of an exemplary system 2000 of an Artificial Intelligence (AI) server 2100. The AI server 2100 comprises a memory module 2160, a processor module 2120 and may comprise a network interface module 2170. In certain embodiments, the processor module 2120 may comprise a data manager 2122 and/or a plurality of processing nodes 2124. The exemplified system 2000 may also comprise a remote workstation 2400, which may be implemented, in certain embodiments, as a thin client to the application running on the AI server 2100. The system 2000 may also include a storage system 2300. The system 2000 may include a network 2200 for connecting the remote workstation 2400 to the AI server 2100 and may also be used for accessing the storage system 2300 or other nodes (not shown). The AI server 2100 may also comprise a cluster manager 2500.

The storage system 2300 may be used for storing and accessing long-term or non-transitory data and may further log data while the system 2000 is being used. FIG. 1 shows examples of the storage system 2300 as a distinct database system 2300A, a distinct module 2300C of the AI server 2100 or a sub-module 2300B of the memory module 2160 of the AI server 2100. The storage system 2300 may be distributed over different systems A, B, C. The storage system 2300 may comprise one or more logical or physical as well as local or remote hard disk drive (HDD) (or an array thereof). The storage system 2300 may further comprise a local or remote database made accessible to the AI server 2100 by a standardized or proprietary interface or via the network interface module 2170. The variants of storage system 2300 usable in the context of the present invention will be readily apparent to persons skilled in the art. In the depicted example of FIG. 1, the AI server 2100 shows an optional remote storage system 2300A which may communicate through the network 2200 with the AI server 2100. The storage module 2300 may be accessible to all modules of the AI server 2100 via the network interface module 2170 through the network 2200 (e.g., a networked data storage system). The network interface module 2170 represents at least one physical interface 2210 that can be used to communicate with other network nodes. The network interface module 2170 may be made visible to the other modules of the network node 2200 through one or more logical interfaces. The actual stacks of protocols used by the physical network interface(s) and/or logical network interface(s) of the network interface module 2170 do not affect the teachings of the present invention. The variants of processor module 2120, memory module 2160, network interface module 2170 and storage system 2300 usable in the context of the present invention will be readily apparent to persons skilled in the art. Likewise, even though explicit mentions of the memory module 2160 and/or the processor module 2120 are not made throughout the description of the present examples, persons skilled in the art will readily recognize that such modules are used in conjunction with other modules of the AI server 2100 to perform routine as well as innovative steps related to the present invention.

The processor module 2120 may represent a single processor with one or more processor cores or an array of processors, each comprising one or more processor cores. The memory module 2160 may comprise various types of memory (different standardized or kinds of Random Access Memory (RAM) modules, memory cards, Read-Only Memory (ROM) modules, programmable ROM, etc.).

A bus 2180 is depicted as an example of means for exchanging data between the different modules of the AI server 2100. The present invention is not affected by the way the different modules exchange information. For instance, the memory module 2160 and the processor module 2120 could be connected by a parallel bus, but could also be connected by a serial connection or involve an intermediate module (not shown) without affecting the teachings of the present invention.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

Figure 2:
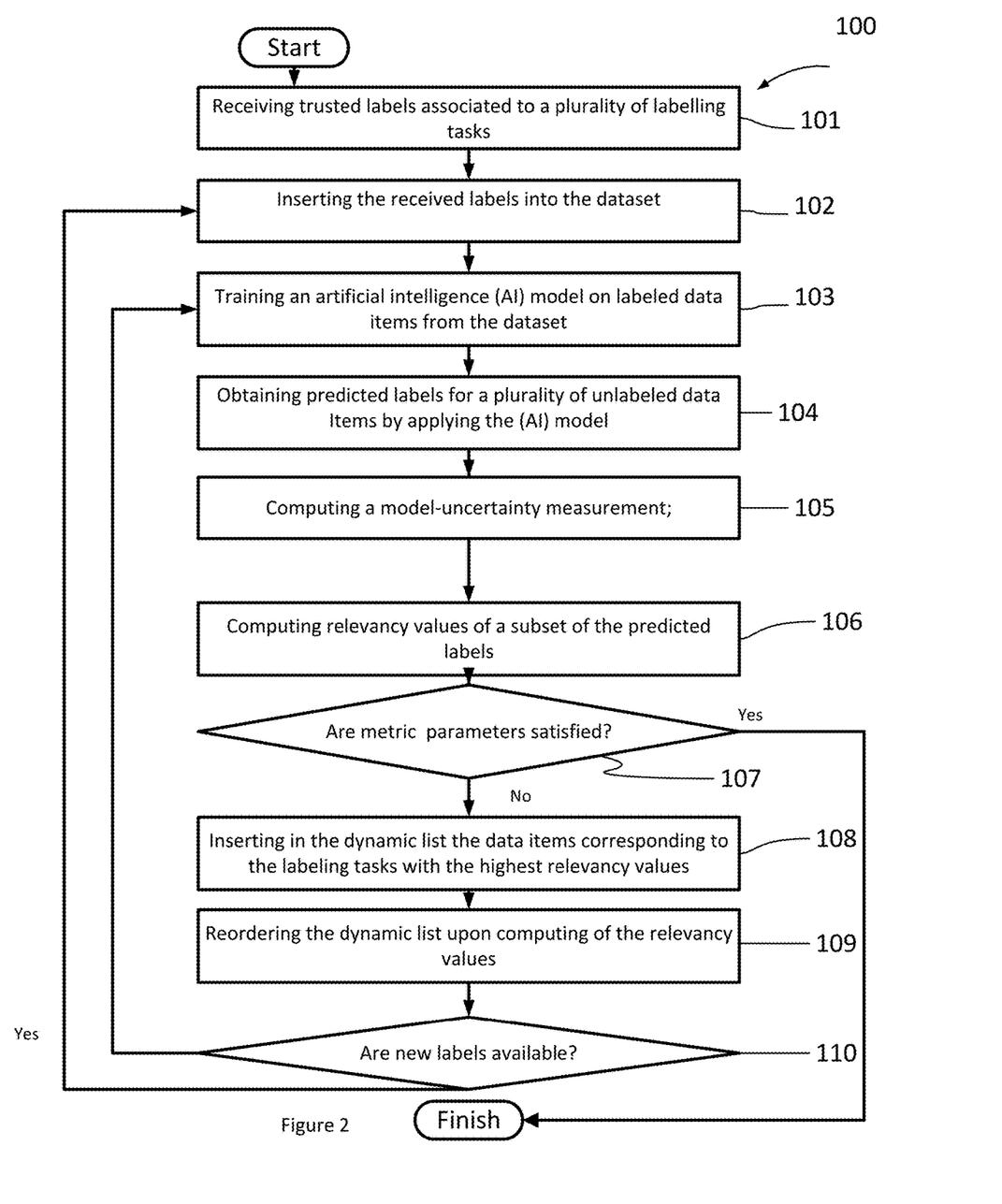
FIG. 2 is a flow chart of an exemplary method for updating a dynamic list of labeling tasks in accordance with the teachings of a first set of embodiments of the present invention.

Reference is now made to the drawing in which FIG. 2 shows a flow chart of an exemplary method 100 for updating a dynamic list of labeling tasks. The method 100 comprises receiving 101 one or more trusted labels associated to a plurality of labelling tasks. The trusted labels are then inserted 102 into a dataset containing data items and their corresponding labeling tasks. The dataset may also comprise trusted labels for labelled data items. An artificial intelligence AI model is trained 103 using a plurality of labeled data items of the dataset. The method 100 also includes obtaining 104 predicted labels for a plurality of unlabeled data items by applying the AI model. Model-uncertainty measurement is afterwards computed 105 for each data item. For each predicted label, the method 100 computes 106 a relevancy value. The steps of the method 100 are repeated 107 unless metric parameters are satisfied. As long as metric parameters are not satisfied, the method 100 goes on to inserting 108 in the dynamic list the data items corresponding to the predicted labels with the highest relevancy values. The dynamic list is then reordered 109 by relevancy value. The data items of the dynamic list are to be labelled by a trusted labeler. If new labels are available 110, the method 100 inserts 102 the received labels into the dataset and resumes the training. Otherwise, the steps of the method are repeated until metric parameters are satisfied.

Still in accordance with the first set of embodiments, the AI server 2100 of FIG. 1 supports the method 100 for updating the dynamic list of the labeling tasks as depicted in FIG. 2. As explained, the data items of the dynamic list are to be labelled by a trusted labeler. In cases where the trusted labeler provides trusted labels from a remote workstation 2400, the data items of the dynamic list will be communicated to the trusted labeler through the network interface module 2170. The dataset used to train the AI model may be stored in a local 2300B, 2300C or remote storage system 2300A. The data manager 2122 of the processor module 2120 receives (e.g., 101) one or more trusted labels associated to a plurality of labelling tasks. The data manager 2122, then inserts (e.g., 102) the trusted labels into a dataset containing data items and their corresponding labeling tasks. The processor module 2120 trains (e.g., 103) an artificial intelligence AI model using a plurality of labeled data items of the dataset. The processor module 2120 computes (e.g., 104) predicted labels for a plurality of unlabeled data items by applying the AI model. The processor module 2120 also computes (e.g., 105) model-uncertainty measurement for each data item and a relevancy value (e.g., 106) for each labeling task. The processor module 2120 repeats the method 100 until metric parameters are satisfied. At each loop, data items corresponding to the labeling tasks with the highest relevancy values are inserted (e.g., 108) in the dynamic list. The dynamic list is then reordered (e.g., 109) by relevancy value. In certain embodiments, the different versions of the dynamic list may be stored in a memory module 2160. At the end of each training loop, if the data manager 2122 receives (e.g., 110) new labels, the data manager 2122 inserts the received labels into the dataset and resumes the training. Otherwise, the artificial intelligence AI model is trained (e.g., 103) on the labeled data items from the dataset.

Metric parameters are defined depending on the labelling task and present exit conditions of the method 100. Examples of metric parameters include the information gain of a labeling task and/or reaching an uncertainty threshold. The information gain may be seen as the amount of information gained by training the AI model on a new trusted label of a labeling task. A person skilled in the art would already recognize that the information gain may be high at the beginning of the process and may, overall, diminish as the training of the AI model advances showing slowing of improvement of the AI model. The information gain may refer to an average information gain or a variation of the information gain between different iterations of the repeated iterations of the method 100. In a preferred embodiment, the information gain may be considered as an average accuracy gain of the model over several iterations of the training. In this way, the model will continue training for a certain number of iterations even if the accuracy does not significantly increase at each iteration. An average accuracy gain of $10^{-4}$ may be considered enough to carry on the training of a dataset having a certain volume. The number of iterations to be performed before stopping the training in case the information gain does not increase may depend on the volume of the dataset. A person skilled in the art will recognize that the ways of setting the information gain do not affect the teachings of the present invention.

In certain embodiments, the deep-learning algorithm may be trained to complete several task categories. In this case, the information gain may be computed for each task category. In this way, the resources can be allocated to the categories where the model needs more training.

A person skilled in the art would already recognize that depending on the definition of the information gain, other metric parameters may be added to represent the evolution of the training. For example, in cases where the AI model behaves poorly on a task and is not fed with new trusted labels, the AI model may not gain information on that particular task. If the method 100 takes into account only information gain, the method 100 may stop the training for that particular task even though the AI model needs more training. Therefore, it would be advantageous that the method 100 accepts other metric parameter such as accuracy and error rate. Accuracy is the proportion of data items for which the model produces correct predicted labels. Error rate is the proportion of data items for which the model produces incorrect predicted labels.

One metric parameter that may be considered can take into account the model-uncertainty measurement. As the model-uncertainty measurement provides information about the confidence of the model in the predicted labels it provides, a model-uncertainty threshold can be set so that the training of the model is considered complete once the model-uncertainty measurement is lower than the model-uncertainty threshold.

In some specific contexts, the model-uncertainty threshold can be a preset value (e.g., 0.1). It can also refer to an average model-uncertainty measurement or a variation of the average model-uncertainty measurement between different iterations of the method 100. It is pertinent to note that the AI models tend to be over confident in the predicted labels they provide, while defining the model-uncertainty threshold metric. A person skilled in the art will recognize that the ways of setting the model-uncertainty threshold do not affect the teachings of the present invention.

The method 100 can, alternatively or in addition, admit different exit conditions. Examples of exit conditions include conditions related to resource consumption associated to the production of the AI model. The resources may be financial resources, time resources or of any other type. In the case of human labelers providing the trusted labels, the cost associated with each labeling task is an example of a financial resource. The cost can be direct such as the hourly fee of the labelers or indirect such as the energy cost of the production of the labels. The time required to a human labeler to label a subset of the dynamic list is an example of a time resource that is directly related to the production of the AI model. In the case where the labeler is a system, a typical example of financial resources can be the indirect costs of acquisition and maintenance of the system. A person skilled in the art may already recognize that different metric parameters may be used depending on the tasks the AI model have to perform.

In accordance with the second set of embodiments, a method and a system are provided for managing a dataset used to train one or more AI models. The data management method is developed to facilitate managing and updating the dataset. The method makes training AI models efficient by performing the relevant computations on a plurality of processing nodes. The computations are performed in parallel on chunk subsets of the dataset. During the training process, the training dataset is chunk into several subset and the AI model is cloned into local AI models on several processing nodes. Each processing node is fed with a subset of the training dataset allowing for parallel computations. The dataset comprises data items and labelling tasks associated to the data items. The dataset also comprises labels corresponding to answers to the labelling tasks.

Prior to the training process, a data mask describing the labeling status of each data item of the dataset is created. The data mask can be created in a form of a vector of the same length as the dataset. Each component of the mask may be associated with a data item of the dataset. A value of 1 may be assigned to each component of the vector associated with a labeled data item. The value of 0 may be attributed to components associated with unlabeled data items. Skill persons will readily recognized that other values may be used without departing from the teachings provided herein. Accordingly, the mask vector provides a summarized information about the labeling status of each data item of the dataset making tracking and working with specific data items less time and energy consuming. The data mask is particularly advantageous during production as it allows for rapid access to the labelling status of labeled and unlabeled data items. Once the data mask is created, the data can effectively be split into two major subsets: a labeled data subset and a pool (i.e., an unlabeled data subset). The labeled data subset comprises all data items associated with a component of the data mask whose value is 1 (i.e., the labeled data subset contains all the labeled data). Due to the data mask, indices of the labeled data items are easily tracked. The labeled subset is used for training purposes. The pool comprises all data items associated with a component of the data mask whose value is 0 (i.e., the pool contains all the unlabeled data). The unlabeled data items are used during uncertainty estimation. A skilled person in the art would already recognize that the data mask is relatively fast to produce and provides an efficient way to track the labelling status of data items of a large dataset without actually searching every data item of the dataset.

To be managed, the dataset is chunked into several subsets in order to train a plurality of local AI models of a plurality of processing nodes. By using the processing nodes as close as feasible to their optimal capacity, the number of the data chunks can be optimized to avoid underflow and overflow conditions. For example, each subset can be as voluminous as the memory of the processing node can fit.

Several functionalities have been implemented to efficiently manage the dataset. Some of these functionalities are presented hereinafter. For instance, an is-labelled function may be provided that takes a data item as input and outputs a Boolean value related to the labeling status of the data item. As an example, one of the data items may be the word "red" and may be associated to a French translation task. The output value of the is-labelled function is 1 if a French translation of the word "red" is already provided. Otherwise, the is-labelled function outputs a value of 0. The is-labelled function may be useful when the labeling status of a data item is requested. The size of the training dataset changes during the training process, as the trusted labelers produce the trusted labels. The num-labelled function may be provided to output the length of the labelled dataset and can therefore be useful for obtaining the size of the training set. A request to label a specific data item can be made through the label function that takes a data item as an input. This feature is particularly useful for research projects where the researcher can request labelling of a specific data item. In research, the training dataset is already correctly labelled and the unlabeled status is simulated for experiments. The unlabel function may be used to erase the label of the input data item of the function. The function unlabel may be used during training but may not necessarily during production. The function pool( ) may be used to output the unlabeled data of a dataset. Conversely, the function labeled( ) may output the labeled data of a dataset. The length of the pool may be obtained using the function num-unlabeled. The functionalities implemented for managing the dataset provide the advantages of instant time access, automatic calling, etc.

Figure 3:
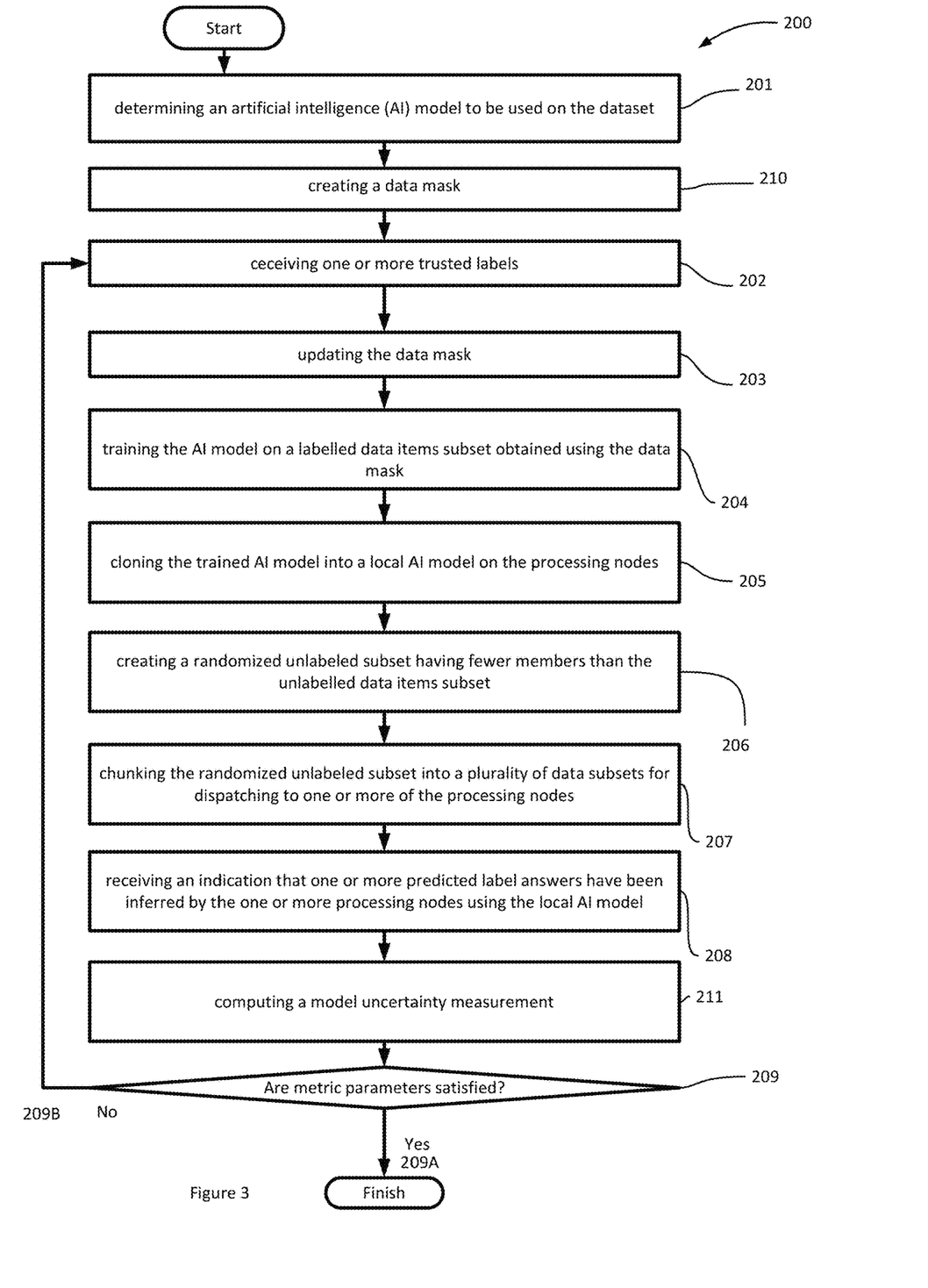
FIG. 3 is a flow chart of an exemplary method for managing a dataset in accordance with the teachings of a first set of embodiments of the present invention.

Reference is now made to the drawing in which FIG. 3 shows a flow chart of an exemplary method 200 for managing a dataset. The method 200 may optionally start by determining 201 an artificial intelligence (AI) model to be used on the dataset. The method 200 may alternatively start by creating 210 a data mask describing a labeling status of the data items of the dataset. Then, the method moves on to receive 202 one or more trusted labels provided by one or more trusted data labelers. After which, the data mask is updated 203 by changing the labeling status of the data items for which a trusted label is received. The AI model is then trained 204 on a labelled data items subset obtained using the data mask. The trained AI model is afterwards cloned 205 into local AI models on the processing nodes. The method creates 206 a randomized unlabeled subset having fewer members than the unlabeled data items subset from which the randomized unlabeled is obtained. The unlabeled data items subset is obtained using the data mask. The randomized unlabeled subset is subsequently chunked 207 into a plurality of data subsets to be dispatched to one or more of the processing nodes. When an indication that one or more predicted label answers have been inferred by the one or more processing nodes using the local AI model is received 208, the model uncertainty measurement is computed 211 from statistical analysis of the one or more predicted label answers. The steps of the method are repeated until metric parameters, as the ones discussed with respect to the first set of embodiments, are satisfied 209. In case where metric parameters are not satisfied, the method loops back to receiving one or more trusted labels 202.

Still in accordance with the second set of embodiments, the AI server 2100 of FIG. 1 may support the method 200 for managing the dataset as depicted in FIG. 3. The processor module 2120 clones (e.g., 205) an AI model into one or more local AI models on a plurality of processing nodes 2124. The processor module 2120 is also responsible for creating and updating (e.g., 210) a data mask describing a labeling status of each data items of the dataset. The dataset to be managed may be stored in a local 2300B, 2300C or remote storage system 2300A. At the cluster manager 2500, the dataset is chunk (e.g., 207) into a plurality of data subsets. The cluster manager 2500 dispatches the data subsets to the processing nodes 2124. The cluster manager 2500 also receives (e.g., 202) trusted labels produced by one or more trusted labelers. In cases where the one or more trusted labelers provide trusted labels from a remote workstation 2400, the trusted labels produced by the one or more trusted labelers may be communicated to the cluster manager 2500 through a network interface module 2170. The cluster manager 2500, dispatches the received trusted labels to the relevant processing nodes 2124 for training their local AI models. The data received from the processing nodes 2124 is used to compute the model uncertainty measurement (e.g., 211). At the processor module 2120, the data mask is updated (e.g., 203) by changing the labeling status of the data items for which a trusted label is received. The steps of the method are repeated until metric parameters, as the ones discussed with respect to the first set of embodiments, are satisfied.

In certain embodiments, the method 200 further comprises updating the dataset by concatenating the predicted label answers received from the one or more processing nodes into an updated dataset to be used in a next iteration of the loop.

In certain embodiments, receiving the indication (step 208 of the method 200) further comprises receiving a local model uncertainty measurement for the local AI model from the respective one or more processing nodes.

In certain embodiments, the method 200 further comprises receiving a computed information gain and/or a computed relevancy values from the one or more processing nodes for one or more predicted labels.

In certain embodiments, the method 200 may request trusted labels for data items having associated therewith higher relevancy value compared to other ones of the data items.

In accordance with a third set of embodiments, a method and a system are provided for optimizing the production of artificial intelligence AI models by optimizing the selection of hyperparameter-tuples used for training deep learning algorithms. The hyperparameter-tuples optimization method is developed to speed up the training of the model. During the optimization process, the initial learning algorithm is cloned into local AI models on several processing nodes. Each local AI model is fed with an n-hyperparameter-tuple allowing for parallel optimization of the hyperparameters.

Figure 4:
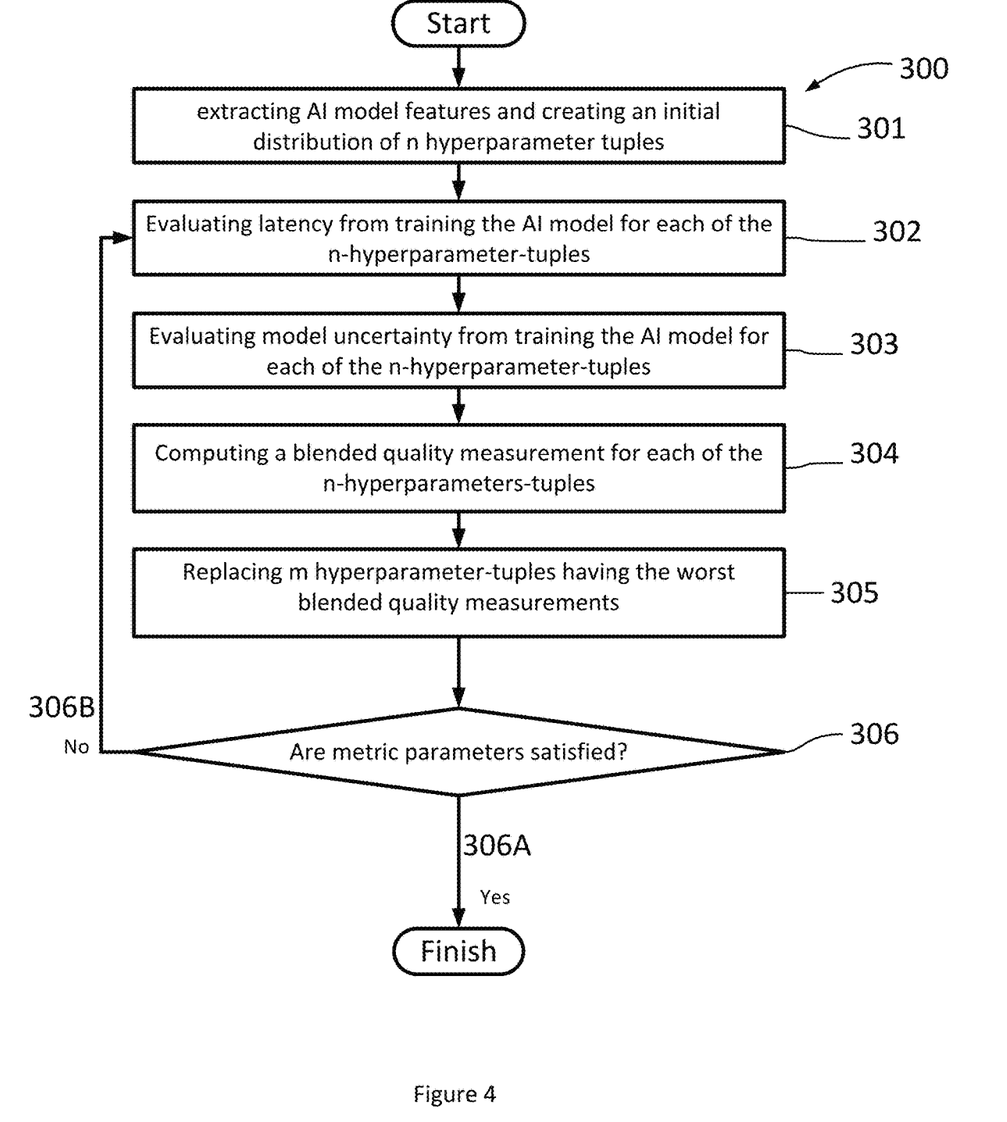
FIG. 4 is a flow chart of an exemplary method optimizing hyperparameter tuples for training a production-grade artificial intelligence AI model in accordance with the teachings of a first set of embodiments of the present invention.

Reference is now made to the drawing in which FIG. 4 shows a flow chart of an exemplary method 300 for optimizing hyperparameter tuples for training a production-grade artificial intelligence AI model. The method 300 comprises for each one of the AI models, extracting 301 AI model features and, for the one AI model, creating an initial distribution of n hyperparameter tuples considering the extracted AI model features therefor. The method 300 then follows with evaluating latency 302 and evaluating model uncertainty 303 from training the AI model for each of the n-hyperparameter-tuples. Then, for each of the n-hyperparameter-tuples, a blended quality measurement is computed 304 from the evaluated latency and evaluated model uncertainty. The method 300 continues with replacing 305 m-hyperparameter-tuples having the worst blended quality measurements with m newly generated hyperparameter-tuples. Unless metric parameters are satisfied 306, the method 300 loops 306B. The metric parameters may include one or more of a threshold value on model uncertainty and blended quality measurement gain between successive loops.

In certain embodiments, the loop is repeated between training cycles for the AI model thereby optimizing the hyperparameter tuples during production use of the one AI model. The loop may also alternatively or additionally be repeated for each of the AI models. As another example, the m-hyperparameter-tuples having the worst blended quality may be replaced with the m newly generated hyperparameter tuples for which a fraction of hyperparameter tuples' constituents is actively selected and a remaining fraction thereof is randomly selected. In certain embodiments, each one of the m-hyperparameter-tuples having the worst blended quality is replaced with one of the newly generated hyperparameter tuple having an actively selected portion of hyperparameter tuples' constituents and a randomly generated portion of hyperparameter tuples' constituents. The hyperparameter tuples' constituents of the actively selected portion may be chosen based on the blended quality measurement from other ones of the n-hyperparameter-tuples. In addition or alternatively, each of the hyperparameter tuples' constituents of the randomly generated portion may be generated within a pre-established range.

In certain embodiments, the number of hyperparameter-tuples that are replaced may vary at each iteration of the optimization process.

Still in accordance with the third set of embodiments, the AI server 2100 of FIG. 1 may support the method 300 for optimizing hyperparameter-tuples used in training of AI models as depicted in FIG. 4. The processor module 2120 may clone an AI model into one or more local AI models on a plurality of processing nodes 2124. The processor module 2120 is also responsible for creating (e.g., 301) an initial distribution of n-hyperparameter-tuples. The dataset to be used during training of the AI models may be stored in a local 2300B, 2300C or remote storage system 2300A. The processor module 2120 evaluates latency (e.g., 302) and model uncertainty (e.g., 303) from training the AI model for each of the n-hyperparameter-tuples. Then, the processor module 2120 computes, for each of the n-hyperparameter-tuples, a blended quality measurement (e.g., 304) from the evaluated latency and evaluated model uncertainty. The processor module 2120 continues with replacing (e.g., 305) m-hyperparameter-tuples having the worst blended quality measurements with m newly generated hyperparameter-tuples. As long as metric parameters are not satisfied 306, the AI server of FIG. 1 continues optimizing the n-tuple-hyperparameters. In cases where the dataset used to train the AI models is provided by labelers from a remote workstation 2400, the dataset may be communicated through a network 2200 to a network interface module 2170 communicating with the processor module 2120. The different sets of n-hyperparameter-tuples and the weights associated therewith may be stored in a memory module 2160 for ulterior retrieval and/or analysis.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for optimizing hyperparameter tuples for training production-grade artificial intelligence (AI) models comprising:
   for each one of the AI models, extracting AI model features and, for the one AI model, creating an initial distribution of n hyperparameter tuples considering the extracted AI model features therefor;
   repeating a loop, until metric parameters are satisfied:
      evaluating latency from training the one AI model for each of the n hyperparameters tuples;
      evaluating model uncertainty from training the one AI model for each of the n hyperparameters tuples;
      for each of the n hyperparameters tuples, computing a blended quality measurement from the evaluated latency and evaluated model uncertainty;
      replacing m hyperparameter tuples having the worst blended quality measurements with m newly generated hyperparameter tuples;
   wherein the metric parameters include one or more of: a threshold value on model uncertainty and blended quality measurement gain between successive loops.

2. The method of claim 1, further comprising repeating the loop between training cycles for the one AI model thereby optimizing the hyperparameter tuples during production use of the one AI model.

3. The method of claim 1, further comprising repeating the loop for each of the AI models.

4. The method of claim 1, wherein the m hyperparameter tuples having the worst blended quality are replaced with the m newly generated hyperparameter tuples for which a fraction of hyperparameters constituents is actively selected and a remaining fraction of the hyperparameters constituents are randomly selected.

5. The method of claim 1, wherein each one of the m hyperparameter tuples having the worst blended quality is replaced with one of the newly generated hyperparameter tuples having an actively selected portion of hyperparameter tuples' constituents and a randomly generated portion of the hyperparameter tuples' constituents.

6. The method of claim 5, wherein the hyperparameter tuples' constituents of the actively selected portion are chosen based on the blended quality measurement from other ones of the n hyperparameter tuples.

7. The method of claim 5, wherein each of the hyperparameter tuples' constituents of the randomly generated portion is generated within a pre-established range.

8. A server for optimizing hyperparameter tuples for training production-grade artificial intelligence (AI) models comprising:
   a processing module that, for each one of the AI models, extracts AI model features and, for the one AI model, creates an initial distribution of n hyperparameter tuples considering the extracted AI model features therefor;
   the processing module repeating a loop, until metric parameters are satisfied, for:
      evaluating latency from training the one AI model for each of the n hyperparameters tuples;

evaluating model uncertainty from training the one AI model for each of the n hyperparameters tuples;

for each of the n hyperparameters tuples, computing a blended quality measurement from the evaluated latency and evaluated model uncertainty;

replacing m hyperparameter tuples having the worst blended quality measurements with m newly generated hyperparameter tuples;

wherein the metric parameters include one or more of: a threshold value on model uncertainty and blended quality measurement gain between successive loops.

9. The server of claim 8, further comprising repeating the loop between training cycles for the one AI model thereby optimizing the hyperparameter tuples during production use of the one AI model.

10. The server of claim 8, further comprising repeating the loop for each of the AI models.

11. The server of claim 8, wherein the m hyperparameter tuples having the worst blended quality are replaced with the m newly generated hyperparameter tuples for which a fraction of hyperparameters constituents is actively selected and a remaining fraction of the hyperparameters constituents are randomly selected.

12. The server of claim 8, wherein each one of the m hyperparameter tuples having the worst blended quality is replaced with one of the newly generated hyperparameter tuples having an actively selected portion of hyperparameter tuples' constituents and a randomly generated portion of the hyperparameter tuples' constituents.

13. The server of claim 12, wherein the hyperparameter tuples' constituents of the actively selected portion are chosen based on the blended quality measurement from other ones of the n hyperparameter tuples.

14. The server of claim 12, wherein each of the hyperparameter tuples' constituents of the randomly generated portion is generated within a pre-established range.

* * * * *